(12) United States Patent
Marzetta et al.

(10) Patent No.: US 7,410,225 B1
(45) Date of Patent: Aug. 12, 2008

(54) MULTI-PART LINKS FOR ENDLESS TRACK

(75) Inventors: Michael Marzetta, Spokane Valley, WA (US); Kriston M. Broxson, Spokane, WA (US); Levi R. Wilson, Spokane Valley, WA (US)

(73) Assignee: Minds-I, Inc., Liberty Lake, WA (US)

( * ) Notice: Subject to any disclaimer, the term of this patent is extended or adjusted under 35 U.S.C. 154(b) by 0 days.

(21) Appl. No.: 11/724,422

(22) Filed: Mar. 14, 2007

(51) Int. Cl.
B62D 55/28 (2006.01)

(52) U.S. Cl. .................. 305/188; 305/191; 305/193; 305/198; 305/159; 305/161

(58) Field of Classification Search ............. 305/157, 305/159, 160, 161, 185, 46, 51, 187, 188, 305/189, 191, 193, 195, 198, 200, 201
See application file for complete search history.

(56) References Cited

U.S. PATENT DOCUMENTS

| | | | | |
|---|---|---|---|---|
| 1,144,284 A | * | 6/1915 | Bassett | 305/200 |
| 1,248,068 A | | 11/1917 | Brunel | |
| 1,450,471 A | * | 4/1923 | Wickersham | 305/50 |
| 2,695,095 A | * | 11/1954 | Anderson | 198/850 |
| 3,053,579 A | | 9/1962 | Trudeau | 305/201 |
| 3,231,316 A | * | 1/1966 | Ruf | 305/162 |
| 3,469,339 A | | 9/1969 | Thomas | |
| 3,628,834 A | * | 12/1971 | Anderson | 305/159 |
| 3,657,838 A | | 4/1972 | Hanning et al. | |
| 3,755,959 A | | 9/1973 | Boberg | |
| 3,811,219 A | | 5/1974 | Fischer | |
| 3,857,617 A | * | 12/1974 | Grawley | 305/180 |
| 4,105,259 A | | 8/1978 | Boucher | |
| 4,141,599 A | * | 2/1979 | Stolz | 305/159 |
| 4,390,214 A | * | 6/1983 | Gunter et al. | 305/161 |
| 4,448,273 A | * | 5/1984 | Barbieri | 180/9.21 |
| 4,694,556 A | * | 9/1987 | Hewitt | 29/451 |
| 4,805,365 A | | 2/1989 | Bastian | |
| 4,882,901 A | | 11/1989 | Lapeyre | |
| 5,049,104 A | | 9/1991 | Olsen | |
| 5,215,185 A | | 6/1993 | Counter et al. | |
| 5,303,818 A | | 4/1994 | Gruettner et al. | |
| 5,409,306 A | | 4/1995 | Bentz | |
| 5,726,023 A | * | 3/1998 | Cheever et al. | 435/7.1 |
| 5,928,051 A | | 7/1999 | Krog | |
| 5,938,497 A | | 8/1999 | Mott | |

(Continued)

FOREIGN PATENT DOCUMENTS

WO   WO 2006/045068   4/2006

*Primary Examiner*—Russell D Stormer
(74) *Attorney, Agent, or Firm*—Wells St. John P.S.

(57) ABSTRACT

An endless track comprising a plurality of links which are releasably, rotatably coupled together to form an endless track, and wherein each of the links has a male linking end, an opposite female linking end, and an outwardly facing surface, and wherein the male linking end of a first link releasably couples and decouples from the female linking end of an adjacent second link when the angular relationship between the first and second links as measured between the outwardly facing surfaces thereof lies in a range of greater than about 45 degrees to less than about 110 degrees, and wherein the first and second links freely rotate one relative to the other when the angular relationship between the first and second links lies in a range of greater than about 110 degrees to less than about 270 degrees.

15 Claims, 11 Drawing Sheets

U.S. PATENT DOCUMENTS

| | | |
|---|---|---|
| 6,301,747 B1 | 10/2001 | Parein |
| 6,540,461 B1 | 4/2003 | Hawang |
| 6,595,825 B1 | 7/2003 | De Wilde |
| 6,732,856 B2 | 5/2004 | Maine, Jr. |
| 6,736,691 B1 | 5/2004 | Bach |
| 7,314,132 B2 * | 1/2008 | Layne et al. ................ 198/850 |

* cited by examiner

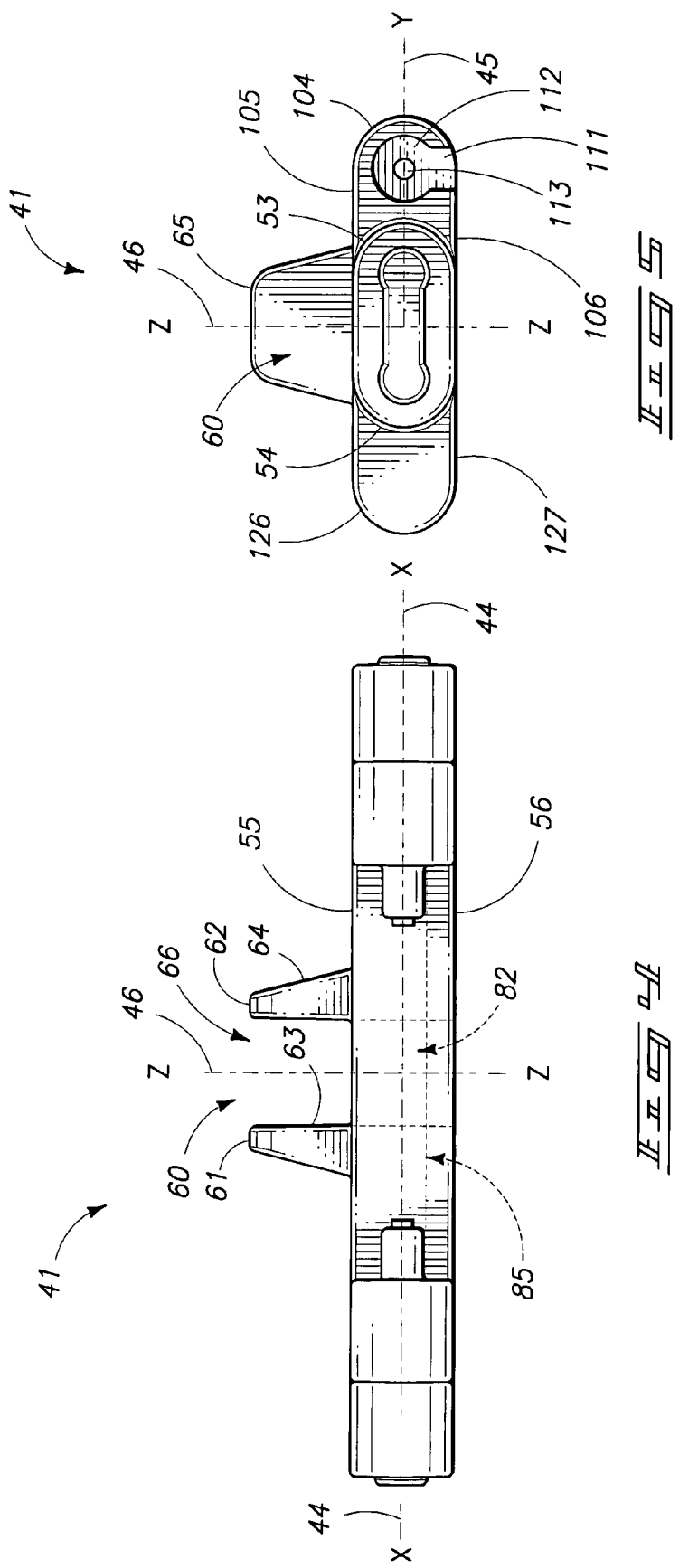

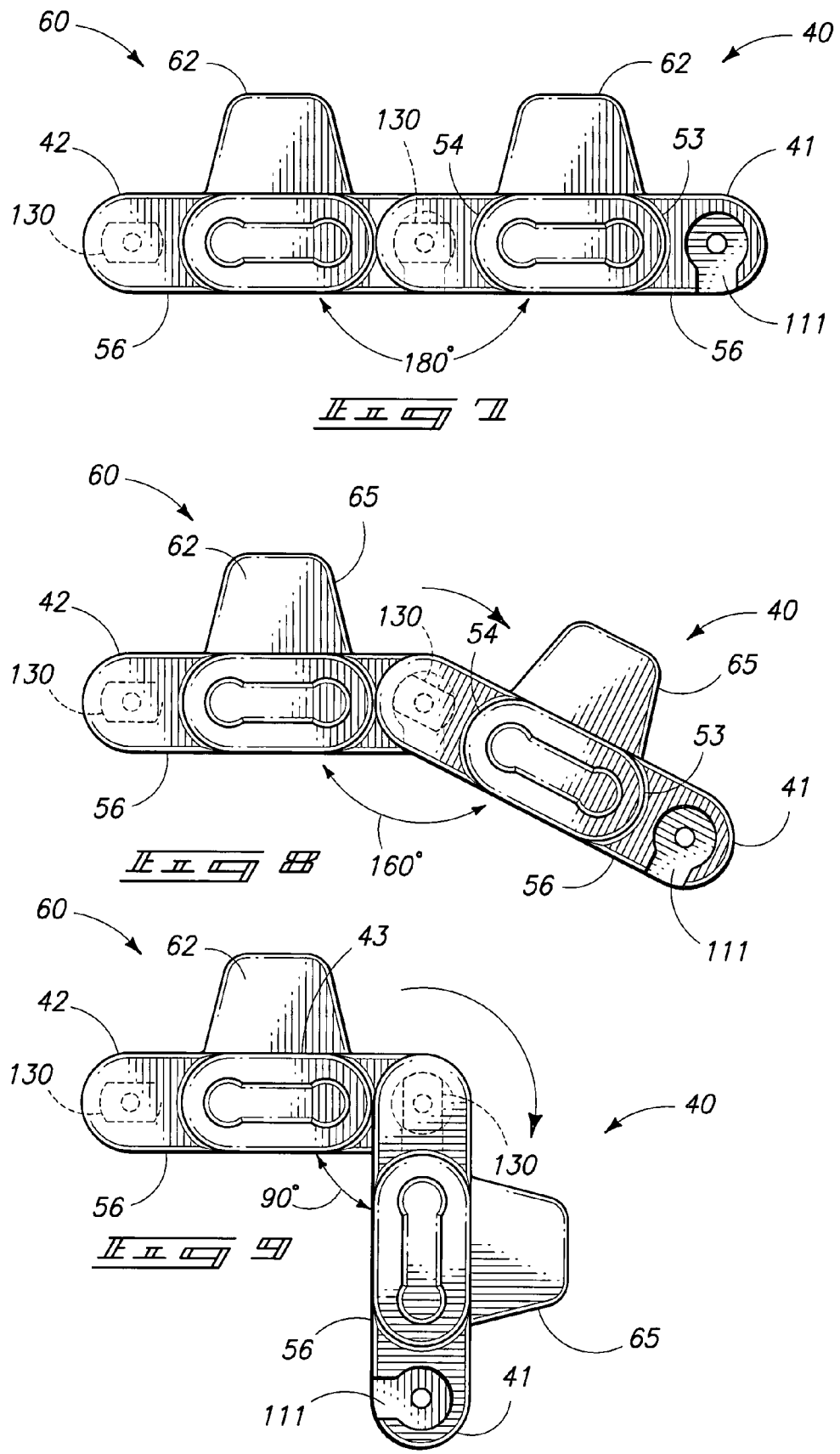

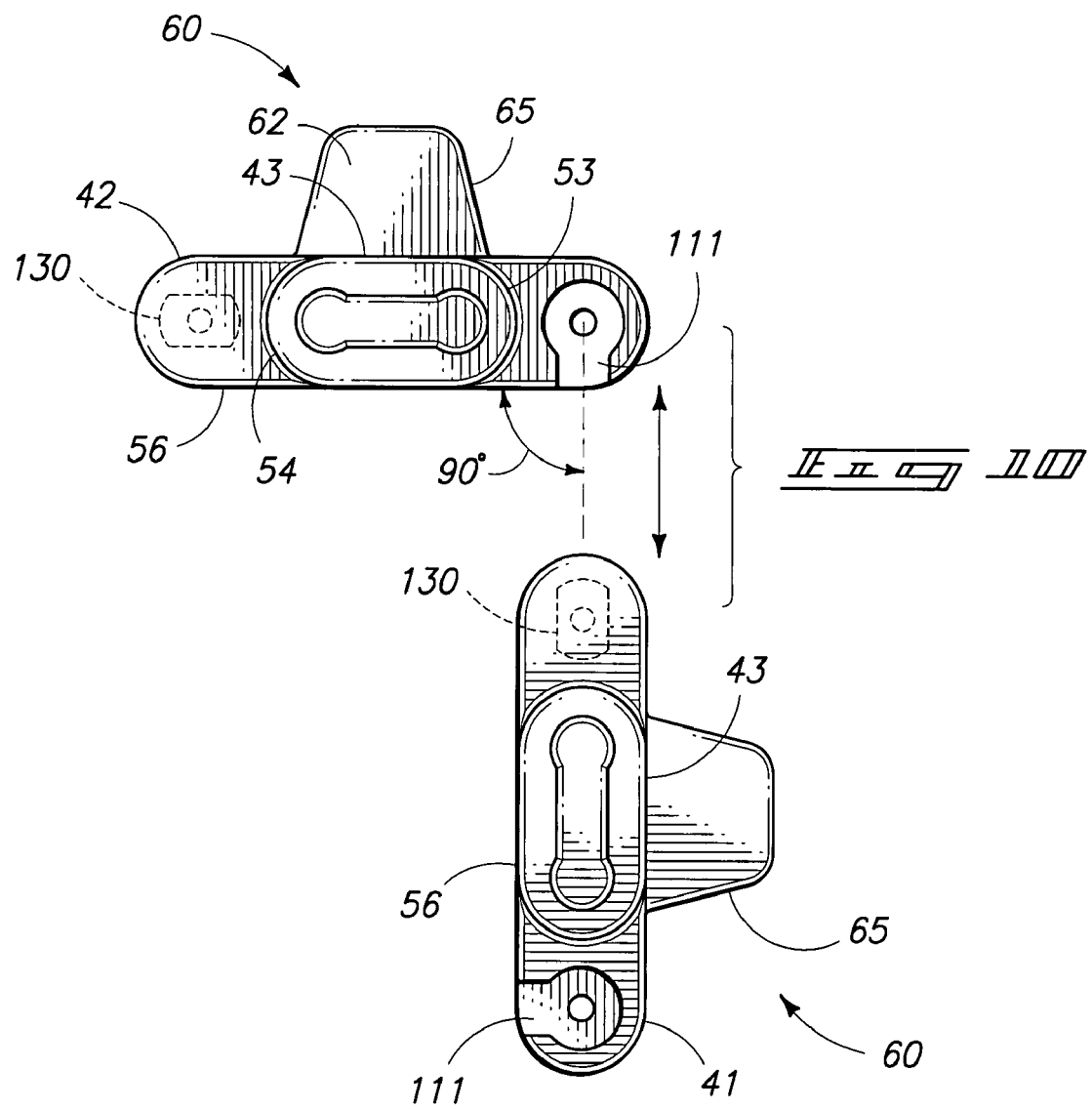

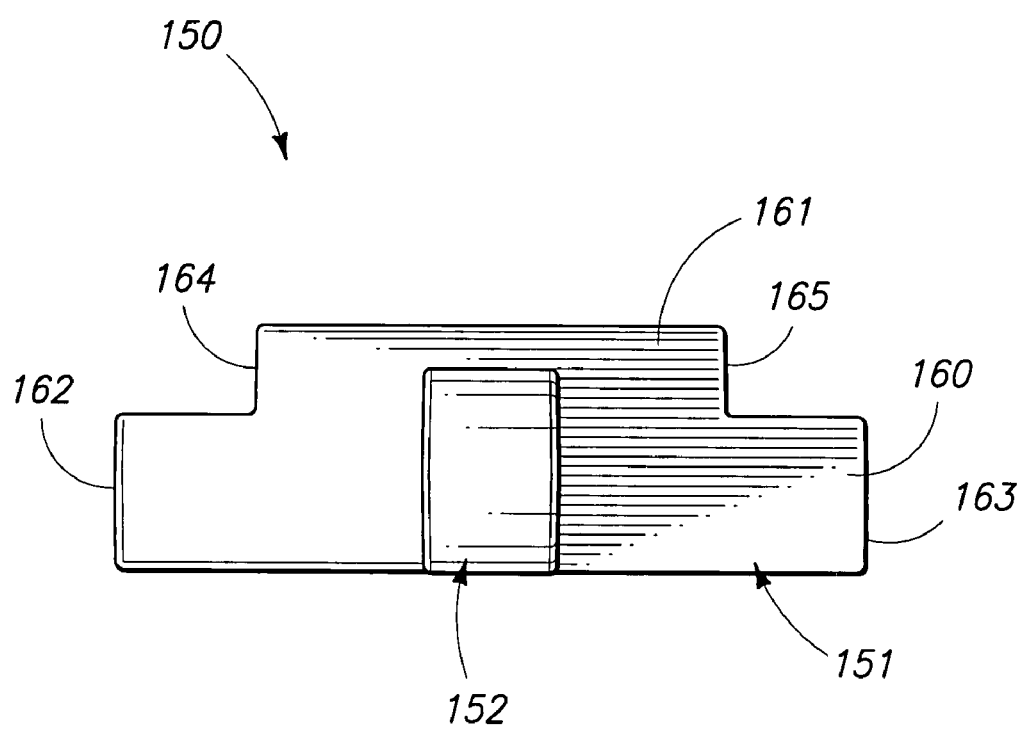

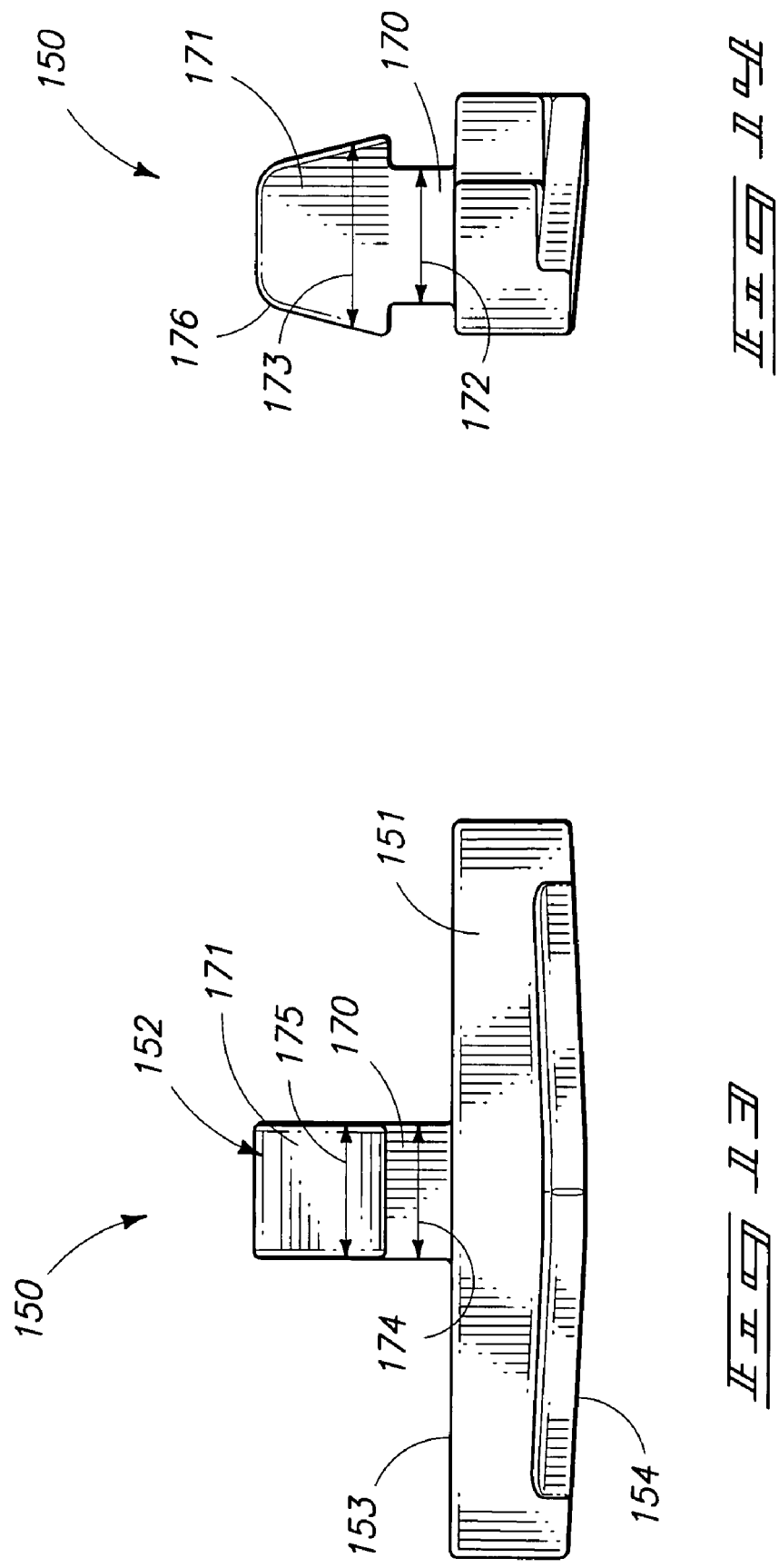

MULTI-PART LINKS FOR ENDLESS TRACK

TECHNICAL FIELD

The present invention relates to an endless track, and more specifically, to a plurality of links which are easily coupled and uncoupled from each other to form an endless track which may be employed with a tracked toy vehicle.

BACKGROUND OF THE INVENTION

Endless tracks or belts comprising a plurality of movable links have many industrial, commercial, and consumer applications. For example, multiple links can form an endless belt for an industrial conveyer system, an endless track for a military vehicle or bulldozer, or even an endless track for toy tracked vehicles. The prior art is replete with variously designed links and linking mechanisms and arrangements. Most of these mechanisms and arrangements involve some form of a removable pivot pin which holds the links together. These prior art pivot pins make the addition or removal of a link (in order to increase or decrease the length of the track) a rather complex procedure. Additionally, the prior art also has many examples of far simpler pin-less linking mechanisms. However, these design have limitations which have detracted from their usefulness in certain environments.

In this regard, the office's attention is directed to U.S. Pat. No. 4,882,901 to Lapeyre and U.S. Pat. No. 6,732,856 to Maine, Jr. Both of these references disclose pin-less linking mechanisms which are suitable for conveyer belt applications. In the Lapeyre reference, a link with a post is shown and which engages a cavity. However, given the shape and relative angle of the cavity, the post will easily slide out of the cavity in many situations because there is no positive coupling action between the post and the cavity. In the Maine, Jr. reference, there is a more positive coupling action, but the need in this case for full rotation between the respective links at virtually all angles, and the need for relative movement between links when the links are on the same plane, makes the links difficult to quickly couple and decouple. These shortcomings are mostly due to the usefulness of these links for conveyer applications. The links and linking systems disclosed in the patents to Lapeyre and Maine Jr. do not appear useful for tracks which might be employed for tracked wheeled vehicle applications.

Multiple designs and configurations for endless tracks for tracked vehicles, such as tanks, bulldozers, and the like, are disclosed in the prior art. These systems involve complex mechanisms designed to accommodate substantial loads and stresses. These systems appear to be specifically designed not to be easily reconfigured, and the technologies do not appear to be useful for tracked toy vehicle applications.

Recently, toy manufacturers have provided various kits which permit a hobbyist to assemble rather complex moveable toys, some of which may be remotely controlled. Such kits often permit the user to assemble robotic vehicles which then may be employed for leisure pursuits and recreational activities. Hobbyists sometimes prefer to build these same kits with ground engaging endless tracks in order to increase the usefulness and recreational value of the remotely controlled vehicles. U.S. Pat. No. 4,105,259 discloses a simple endless track for a toy tracked vehicle which consists of a plurality of U-shaped wire links. Unfortunately, this design does not allow for the convenient removal or addition of links. Further, because the links are made of wire, there is typically little friction generated between the track and the surface on which the toy may operate. Consequently, the movement of the toy may be impaired when it is utilized on certain smooth or hard surfaces.

Therefore, there is a need for a endless track that can be applied to a toy tracked vehicle application, and that provides for positive, enhanced traction with the underlying supporting surface, and that further permits the easy removal and addition of links to accommodate hobbyists who may desire to assemble many different sizes of track, as might be required in a vehicle construction toy as described above.

An endless track which avoids the shortcomings attendant with the prior art devices utilized heretofore is the subject matter of the present application.

SUMMARY OF THE INVENTION

A first aspect of the present invention relates to an endless track that is made from a plurality of links which are releasably, rotatably coupled together to form an endless track, and wherein each of the links has a male linking end, an opposite female linking end, and an outwardly facing surface, and wherein the male linking end of a first link releasably couples, and decouples from the female linking end of an adjacent second link when the angular relationship between the first and second links as measured between the outwardly facing surfaces thereof lies in a range of greater than about 45 degrees to less than about 110 degrees.

Another aspect of the present invention relates to an endless track that is made from a plurality of detachable adjacent links, and wherein each link includes a main body with inwardly and outwardly facing surfaces, a male linking end, and an opposite female linking end; and wherein the male linking end includes an engagement member that protrudes from the main body, and the female linking end includes a receiving station, and wherein the receiving station of a first link releasably matingly couples with the engagement member of a second adjacent link when the angular relationship as measured between the outwardly facing surfaces of the first and second links are oriented at an angle of less than about 110 degrees; and wherein the engagement member of the second link freely rotates within the receiving station of the first link without detaching from the first link when the angular relationship as measured between the outwardly facing surfaces of the first and second links is at an angle of greater than about 110 degrees.

Another aspect of the present invention relates to an endless track link which includes a main body which has a leading and a trailing edge, a male linking member extending outwardly relative to the leading edge, and a female receiving station made integral with the trailing edge of the main body, and which is dimensioned to receive the male linking member of an adjacent endless track link; and a detachable traction component releasably matingly coupled to the main body of the endless track link.

Yet another aspect of the present invention relates to an endless track link which includes an elongated main body having opposite first, and second ends, and a leading and a trailing peripheral edge, and wherein the main body has an outwardly facing surface defined, at least in part by opposite, first and second outwardly facing surfaces, and wherein a passageway is formed substantially centrally of the main body, and extends between the first and second outwardly facing surfaces; a male linking member made integral with the leading edge of the main body and positioned between the opposite first and second ends thereof, and wherein the male linking member has a length dimension and further extends substantially normally outwardly relative to the leading peripheral edge; a female receiving station made integral with the trailing edge of the main body, and which defines a cavity having a length dimension which is equal to or greater than the length dimension of the male linking member; and a detachable traction component having a first portion which is juxtaposed relative to the outwardly facing surface of the main body and a second deformable portion which is sized so as to be received through the passage, and which couples the detachable traction component to the main body in the manner of a snap-fit.

These and other aspects of the present invention will be described in greater detail hereinafter.

BRIEF DESCRIPTION OF THE DRAWINGS

Preferred embodiments of the invention are described below with reference to the following accompanying drawings.

FIG. 4 is a rear elevation view of a link which forms a feature the present invention.

FIG. 5 is a side elevation view of a link which forms a feature the present invention.

FIG. 7 is a side elevation view of two coupled links, and which are shown in a non-rotated coplanar orientation.

FIG. 8 is a second, side elevation view of two coupled links, and which are shown in a partially rotated orientation.

FIG. 9 is a third, side elevation view of two coupled links, and which are shown in a 90 degree rotated orientation.

FIG. 10 is a fourth side elevation view of two uncoupled links, and which are shown in a 90 degree rotated orientation.

FIG. 12 is a top plan view of a detachable traction component, and which forms a feature of the present invention.

FIG. 13 is a rear elevation view of a detachable traction component, and which forms a feature of the present invention.

FIG. 14 is a side elevation view of a detachable traction component, and which forms a feature of the present invention.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
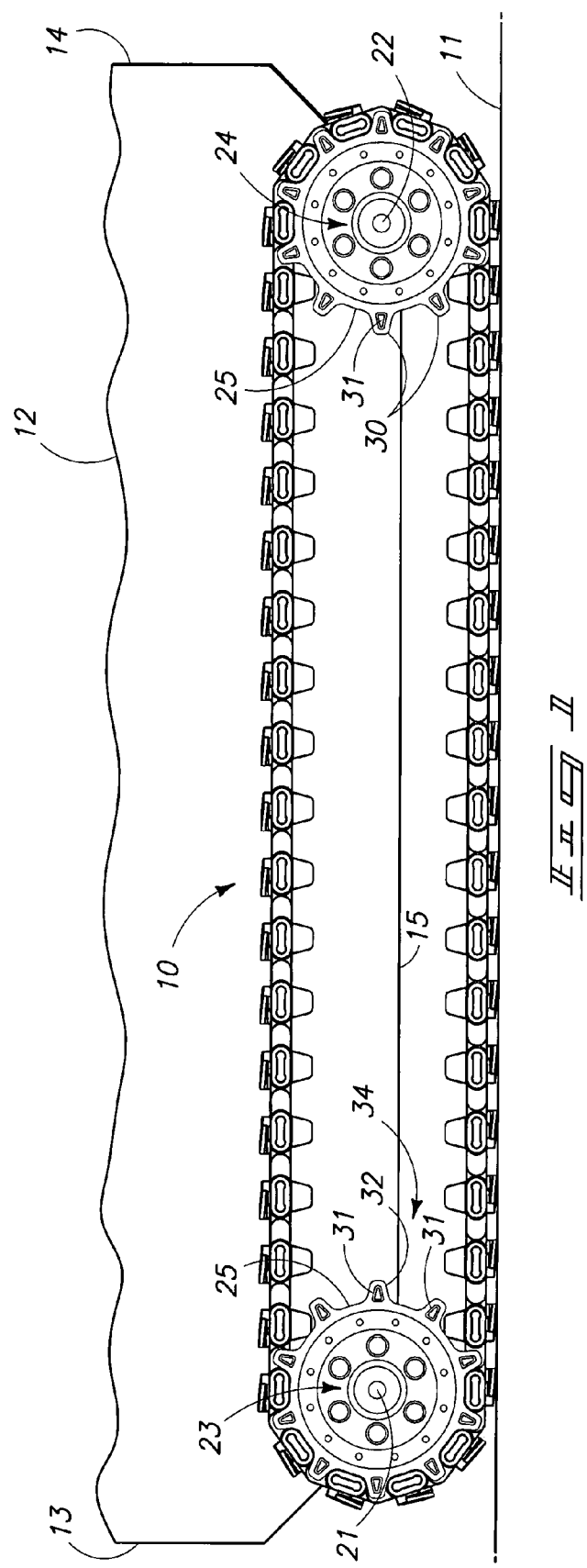
FIG. 1 is a fragmentary, side elevation view of the present invention and which is shown as it would appear when employed on and with a tracked toy vehicle.

Referring now to FIG. 1, the present invention is generally designated by the numeral 10. The invention as seen in that view is operable to frictionally engage a surface of the earth or other supporting surface 11. A toy tracked vehicle 12 is fragmentally depicted with an endless track 10 moveably mounted on same, and which is employed to propel the vehicle 12 across the support surface 11. The toy tracked vehicle 12 may be a model of a military vehicle, tank, bulldozer, off-road vehicle, or any other vehicle or robot on which an endless track may be employed for propulsion purposes. The toy tracked vehicle 12 may be provided to a hobbyist or consumer as a kit (not shown), and in which any number of the various components of the toy tracked vehicle are provided as separate pieces. As should be understood, in some kits, the hobbyist or consumer may be able to assemble the various components into multiple configurations. These various configurations may include several different length configurations for the endless track 10. One salient feature of the present invention 10 is the ability to easily reconfigure the endless track, as to length, by easily coupling and uncoupling the individual links which make up the endless track 10. The respective links shall be discussed in greater detail hereinafter.

Referring still to FIG. 1, the toy tracked vehicle 12 is placed on a supporting surface 11, which may include the surface of the earth; a paved surface; a floor; a table; or any other supporting surface upon which the toy tracked vehicle may be deployed. The toy tracked vehicle 12 has generally a first end 13; a second end 14; and a bottom surface 15. In the depicted embodiment of the toy tracked vehicle 12, the first end is supported by a first axle 21, and the second end is supported by a second axle 22 in spaced relation relative to the supporting surface 11. In other possible embodiments, additional axles or tension (idler) wheels (not shown) may be employed on the toy vehicle 12 and which could be helpful for guiding the endless track 10. A first drive sprocket 23 is rotatably mounted on the first axle 21, and a second drive sprocket 24 is rotatably mounted on the second axle 22. It will be appreciated that additional drive sprockets may be mounted on the opposite ends (not shown) of each axle. One skilled in the art will recognize that multiple combinations of axles and drive sprockets could be employed in a toy tracked vehicle 12 as depicted in FIG. 1.

Referring still to FIG. 1, it will be appreciated that the drive sprockets 23 and 24 are characterized, from a side elevation view, as having a generally circular shape with an outer peripheral edge 25. Extending radially outwardly from the peripheral edge 25 are a plurality of sprocket teeth 30 which are substantially equidistantly spaced along the peripheral edge 25. A space 34 is defined between each of the adjacent sprocket teeth 30. Each sprocket tooth 30 has a substantially frusto-pyramidal shaped main body 31 which defines a first side wall 32 and a second side wall 33. Variations on the number, spacing, and shape of the sprocket teeth may be used in different embodiments of the invention. The size, shape, and spacing of the sprocket teeth 30 in the embodiment as depicted in FIG. 1 are selected so as to matingly cooperate with, and otherwise forcibly engage the individual links of the endless track 10, as shall be discussed in detail, below. As will be appreciated, the toy tracked vehicle 12 may include at least one motor, not shown, and which is coupled in force transmitting relation to one or both of the axles 21 or 22. Typically, this motor is electrically energized by a battery. However, an internal combustion motor may be employed in some toy applications. The tracked toy vehicle 12 could be remotely controlled by a controller (not shown).

Figure 2:
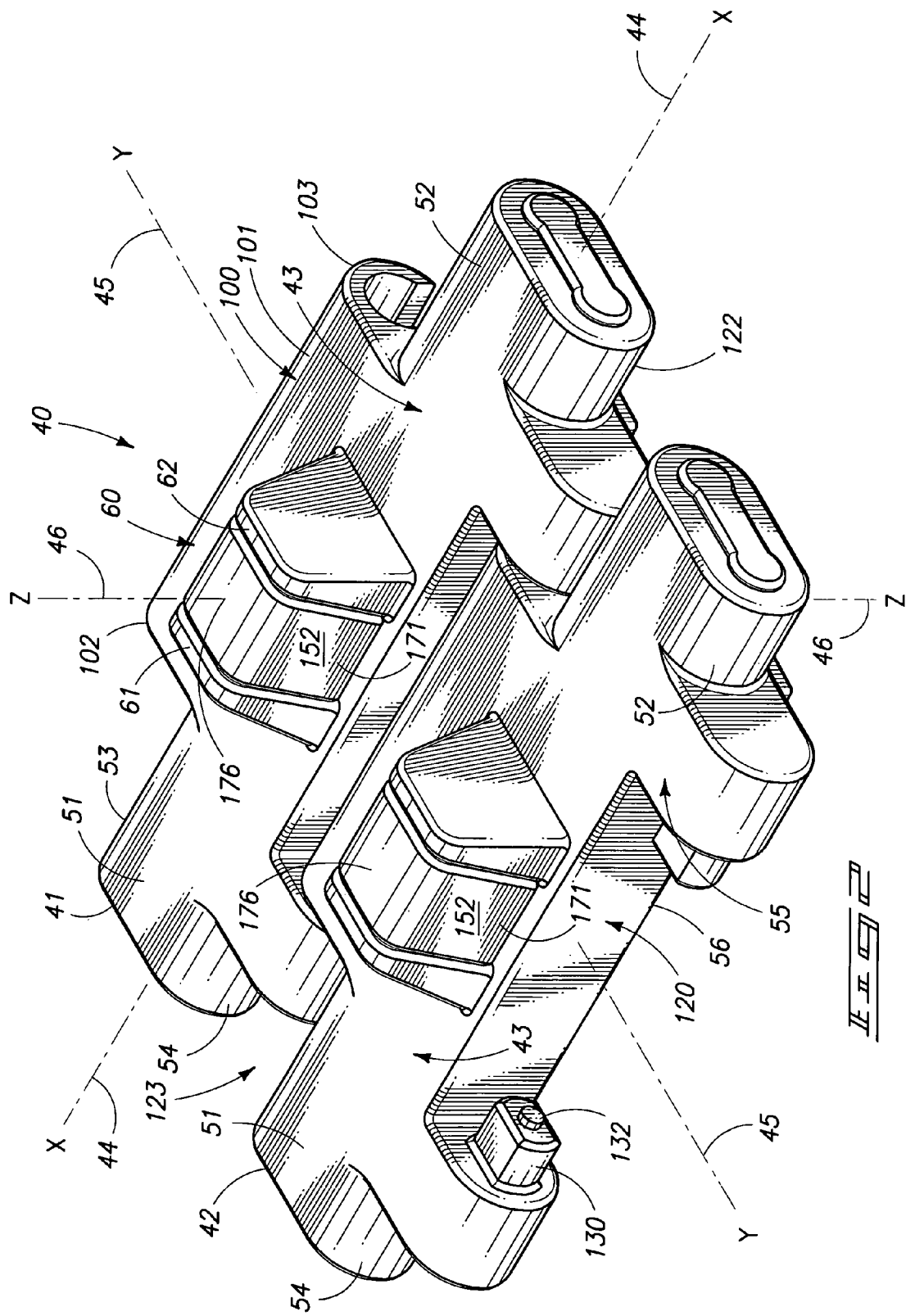
FIG. 2 is a perspective top view of two coupled links, and which form a portion of the endless track of the present invention.

Referring now to FIGS. 2-10, the endless track 10 comprises a plurality of links 40, and which are rotatable, one relative to the other (FIGS. 7-10). Referring now to FIG. 2, two of the plurality of links 40 are shown in a coupled configuration relative to each other. The links 40 as illustrated in FIG. 2 and following, include a first link 41, and a second link 42. Each link 41 and 42 includes an elongated main body 43. The main body 43 is generally coaxially oriented about a defined X-axis 44; a Y-axis 45; and a Z-axis 46, as depicted in FIG. 2 and following. In the preferred embodiment of the invention, the plurality of links 40 are fabricated of a moldable thermoplastic material with a relative hardness appropriate for the toy application being contemplated by the hobbyist. One skilled in the art will recognize that the links 40 may also be fabricated from other types of moldable, castable, or machinable materials, including metals and other plastics, depending upon how robust the hobbyist wants the toy vehicle to become.

Figure 3:
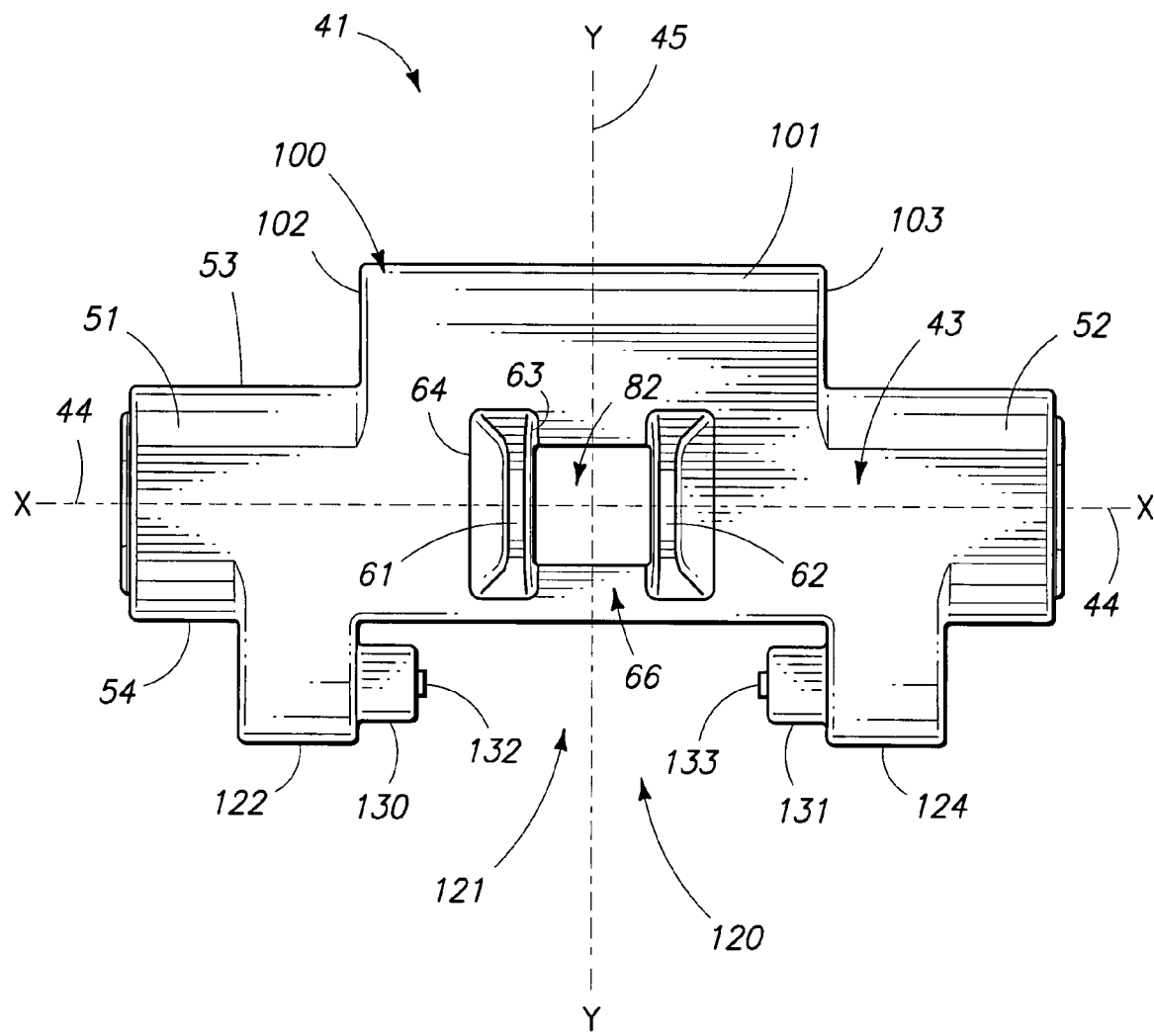
FIG. 3 is a top plan view of a link which forms a feature of the present invention.

Referring now to FIG. 3, the first link 41 is shown from a top plan view. The main body 43 has a first end 51 and a second end 52. The main body 43, in the region of each end 51 and 52, is further defined by a peripheral leading edge 53, and a trailing edge 54. It will be noted that both of these edges are defined by substantially uniformly curved surfaces. The substantially curved shape of the leading edge 53 and trailing edge 54 is best shown in FIG. 5. It will be appreciated that the width of the main body 43 as measured substantially along the Y-axis 45, between the leading edge 53 and trailing edge 54, is sized so as to be substantially matingly received into the space 34, which is defined as that between adjacent sprocket teeth 30 of the sprocket wheels 23 and 24, as shown on FIG. 1. Moreover, the curved shape of leading edge 53 and trailing edge 54 is provided so as to ensure smooth engagement of the main body 43, with the respective sprocket teeth 30 as the main body 43 repeatedly enters and departs from the several spaces 34 of the respective sprocket wheels 23 and 24 during the rotation of same. Referring now to FIG. 4, the first link 41 is shown from a rear elevation view. The main body 43 of the first link 41 has a first or inwardly facing surface 55 and a second or outwardly facing surface 56. Protruding outwardly from the first or inwardly facing surface 55, and in the direction of the Z-axis 46, is a sprocket engaging or alignment tooth 60, which includes a first portion 61, and a second portion 62. Each portion 61 and 62 of the sprocket engaging or alignment tooth 60 includes a first inwardly facing surface 63; a second outwardly facing surface 64; and a peripheral edge 65 (shown in FIG. 5). A space 66 is defined between the respective inwardly facing surfaces 63. The peripheral edge 65, as shown in FIG. 5, has a substantially frusto-pyramidal shape, viewed from a side elevation, which is taken along the X-axis 44. The sprocket tooth 60 aligns and engages the sprocket wheels 23 or 24 (shown in FIG. 1).

Figure 6:
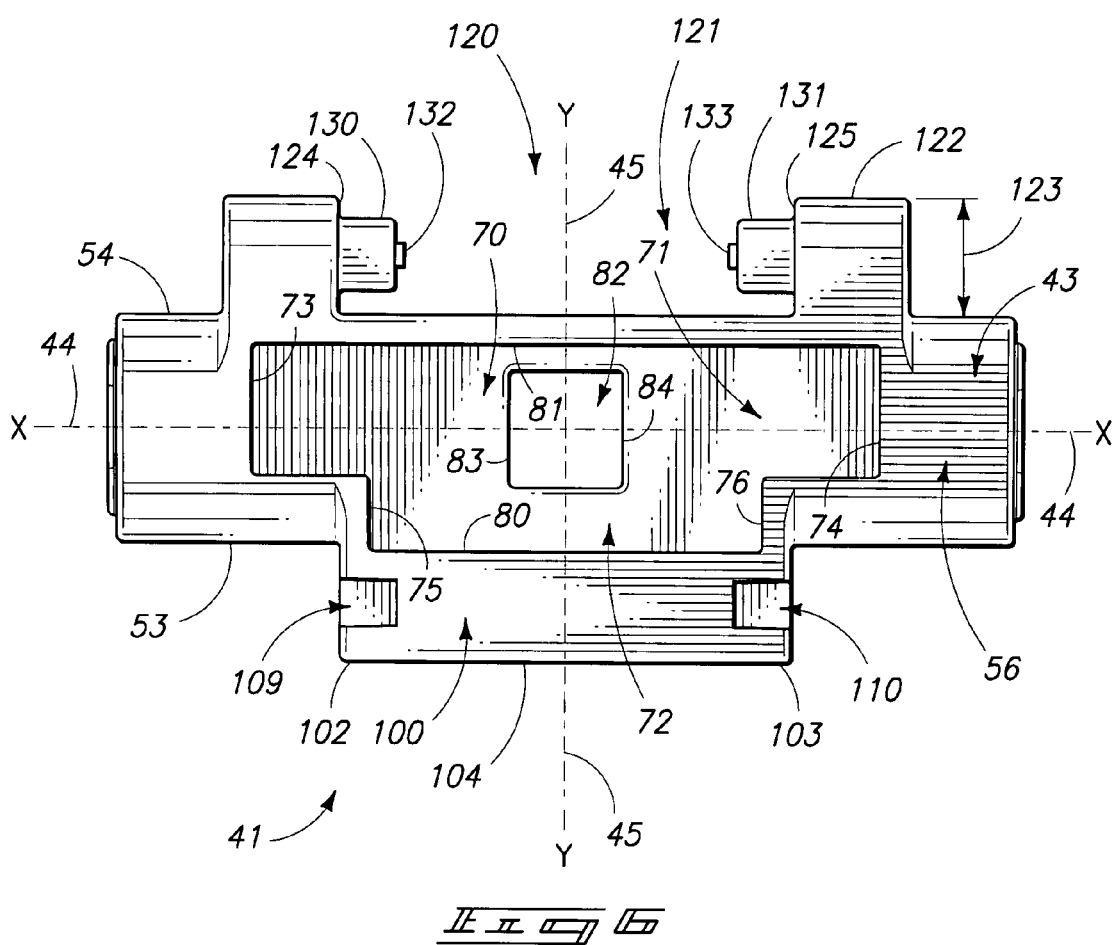
FIG. 6 is a bottom plan view of a link which forms a feature the present invention.

Referring now to FIG. 6, the first link 41 is shown from a bottom plan view. The outwardly facing surface 56 of the main body 43 defines a receiving station 70 for receiving a traction component 150, which will be discussed in further detail below. The receiving station 70 further has a first portion 71, and a second portion 72. The first portion 71 of the receiving station 70 is defined by a first end 73, and an opposite second end 74. This portion is generally longitudinally oriented along the x-axis 44 of the main body 43. The second portion 72 is adjacent to the first portion 71 and oriented in spaced substantially parallel relation relative to the x-axis 44. The second portion 71 is defined by a first end 75 and an opposite second end 76. The receiving station 70, is further defined by a leading edge 80 and a trailing edge 81. It should be understood that the receiving station 70 may be characterized by any number of shapes. Further, the shape will substantially correspond with the exterior shape of a traction component 150, as described in detail below. Further, the receiving station 70 is recessed within the outwardly facing surface 56 of the main body 43 to the extent of a depth dimension 85, as indicated in FIG. 4. The main body 43 also defines a substantially square shaped passageway 82, which extends through the main body 43 and substantially concentrically along the z-axis 46. The passageway 82 is defined by a first end 83 and a second end 84, which define a width dimension which is substantially similar to the space 66 which is defined therebetween the first and second portions 61, 62 of the sprocket tooth 60, as shown in FIG. 4. The passageway 82 is substantially coaxially aligned with the space 66. The passageway 82 will matingly receive a second portion of a traction component, which is defined in detail below.

Referring now to FIGS. 3, 5, and 6, the first link 41 is shown from a top plan view, a side elevation view, and a bottom plan view, respectively. The first link 41 comprises a male linking end or member 100 and a female linking end or member 120. The male linking end or member 100 includes a main body 101 which protrudes from the main body 43 of the first link 41, and along the y-axis 45. The main body 101 is defined by a first end 102, and a second end 103, and which is disposed in spaced substantially parallel relation relative to the x-axis 44 of the main body 43. The main body is further defined by a leading edge 104, which has a substantially rounded shape, which is best shown in FIG. 5. The main body 101 is further defined by an inwardly facing surface 105, and an outwardly facing surface 106, which are also shown in FIG. 5. The main body 101 further defines a first receiving cavity 109 recessed into the first end 102, and a second receiving cavity 110 recessed into the second end 103. Each receiving cavity 109 and 110 is oriented or otherwise extends in a direction which is substantially parallel to the x axis 44, and further comprises a first cavity 111 having a width dimension which is measured in a direction which is substantially parallel to the y axis 45; and a second cavity 112 that is coupled to the first cavity 111 and which extends in the direction of the inwardly facing surface 105 of the engagement member 101. The second cavity 112 is further oriented in substantially parallel spaced relation relative to the z axis 46, and has a length and a width dimension. The receiving cavities 109 and 110 are further defined by a smaller, third cavity 113 which is coupled to the first and second cavities 111 and 112, and which extends in an orientation which is substantially parallel to the x axis.

Referring still to FIGS. 3, 5, and 6, the female linking end or member 120 defines a receiving station 121, which is oriented generally along the y-axis 45. The female linking end 120 also includes a trailing edge 122. A link gap 123 is defined therebetween the trailing edge 54, and the female linking end trailing edge 122. The link gap 123 is sized so as to allow the sprocket tooth 30 of the respective drive sprockets 23 and 24 to matingly fit within the link gap 123 as the drive sprockets 23 and 24 matingly cooperate and forcibly engage the endless track 10, as shown in FIG. 1. The receiving station 121 of the female linking end 120 is further defined by a first end 124, and a second end 125. As seen in the drawings, the receiving station 121 is further defined by an inwardly facing surface 126 and an outwardly facing surface 127. These are shown in FIG. 5. The width dimension of the receiving station 121 as measured along the x-axis 44, is substantially equal to the width dimension of the main body 101 of the male linking end or member 100. Thus, the main body 101 of the second link 42 matingly fits within the receiving station 121 of the first link 41, when the first and second links are coupled together. This is best shown in FIG. 2.

Referring now to FIGS. 3 and 6, extending inwardly into the receiving station 121 are first and second posts 130 and 131, respectively. The posts are oriented in substantially parallel spaced relation relative to the x axis. They further extend into the receiving station 121 from the first end 124 and the second end 125, respectively. Each post 130 and 131 has a length dimension when measured in a direction which is substantially parallel to the y axis 45, and a width dimension when measured in a direction which is substantially parallel to the z axis 46. The length dimension of the respective posts 130 and 131 is greater than the width dimension thereof, and the width dimension of the first cavity 111 of the main body 101 is greater than the width dimension of the posts 130 and 131, and is less than the length dimension of the posts 130 and 131. Further, the length and width dimensions of the second cavity 112 of the engagement member 101 are greater than the length dimension of the posts 130 and 131. A first smaller protrusion 132 extends substantially coaxially, outwardly relative to the first post 130; and a second smaller protrusion 133 extends substantially coaxially, outwardly relative to the second post 131. The manner in which the female linking end 120 of the first link 41 couples with the male linking end 100 of an adjacent second link 42 is discussed in greater detail below.

Referring now to FIGS. 11-15, a detachable traction component 150 is provided and is now described in greater detail. Generally speaking, the detachable traction component 150 is intended to be inserted by the hobbyist into the main body 43 of one or more of the plurality of links 40 of the endless track 10. The traction components 150 may be provided as a separate piece of the kit to be installed by the hobbyist or may be pre-installed within the links by the manufacturer. The traction components are most commonly fabricated from a moldable thermoplastic with a hardness that is less than that of the respective links 40. The hardness of the plastic should be such that it provides an adequate coefficient of friction as compared to the supporting surface 11 upon which the endless track 10 is intended to be operated. Further, the thermoplastic may be deformable so that the traction component 150 may be easily inserted into or detached from the respective links 40, as described in more detail below.

Figure 11:
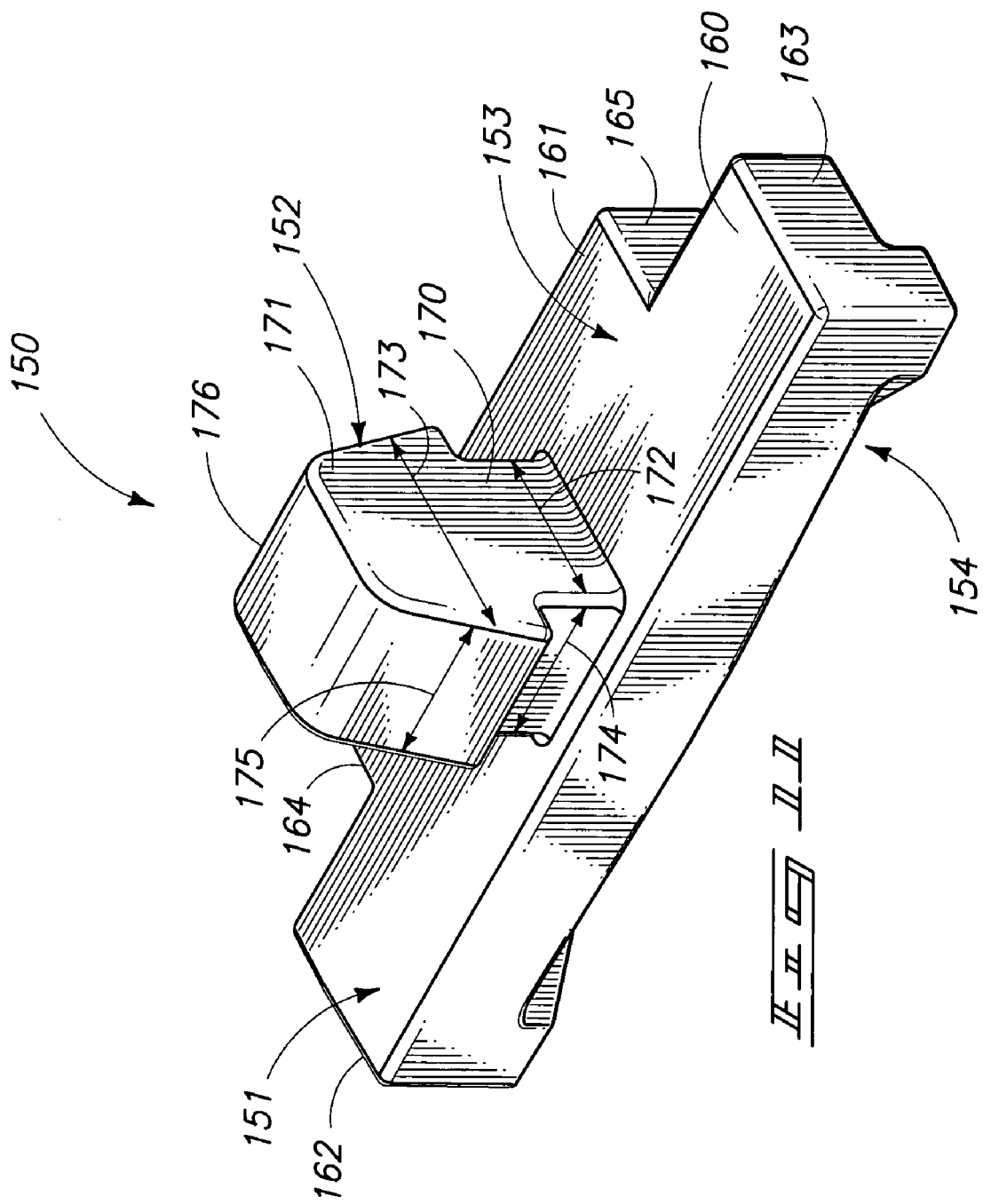
FIG. 11 is a perspective top plan view of a detachable traction component, and which forms a feature of the present invention.
Figure 15:
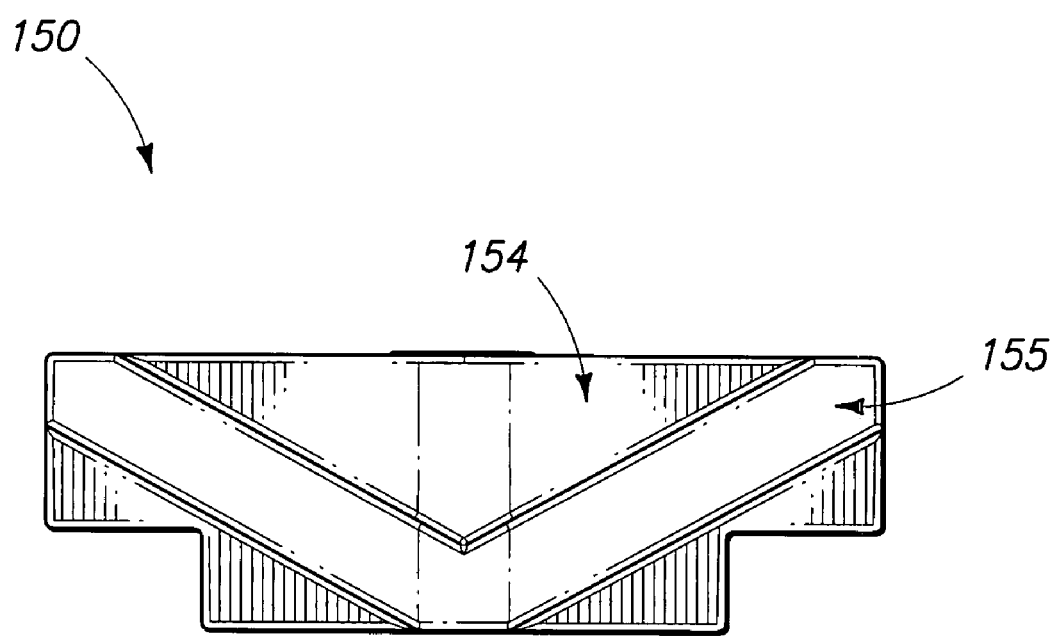
FIG. 15 is a bottom plan view of a detachable traction component, and which forms a feature of the present invention.

Referring now to FIGS. 11 and 12, the traction component 150 comprises a first portion 151, and a second portion 152. The first portion 151 has a first, inwardly facing surface 153, and a second, outwardly facing surface 154. When the traction component 150 is inserted into a link 41, the first, inwardly facing surface 153 is matingly receive within the receiving station 70 of the link 41, as described, above. Further, the second, outwardly facing surface 154 extends outwardly a limited distance from the outwardly facing surface 56 of the main body 43 of the link 41, and is placed into contact with the supporting surface 11 when the endless track 10 is operated. Further, the second outwardly facing surface 154 may further define a tread pattern 155 (as best seen in FIG. 15) and which provides additional traction or otherwise replicates the tread of an actual tracked vehicle. It will be recognized that the tread pattern 155 may have any of a number of shapes and configurations that are useful in tread patterns for vehicle tires or endless tracks, including a chevron shape as shown in FIG. 15, and also including spikes, paddles, or other shapes and configurations that replicate the surface engagement component of an actual vehicle.

Referring again to FIGS. 11 and 12, the first portion 151 of the traction component 150 is defined, in part, by a first part 160, and an adjacent second part 161. The first part 160 has a first end 162, and a second end 163; and the second part 161 has a first end 164 and a second end 165. The first part 160 is matingly received within the first portion 71 of the receiving station 70; and the second part 161 is matingly received within the second portion 72 of the receiving station 70. It will be recognized that the first portion 151 of the traction component 150 can be characterized by any number of shapes, as long as it has a portion which substantially corresponds in shape to the receiving station 70. Further, the first portion 151 has a thickness dimension which is greater than the depth dimension 85 of the receiving station 70, so as to allow the traction component 150 to extend beyond the outwardly facing surface 56 of the main body 43 of the link 41.

Referring now to FIG. 11, the second portion 152 of the traction component 150 is made integral with the first portion 151 and extends normally outwardly relative to the first surface 153 of the first portion 151. The second portion 152 has a first end 170, and an opposite second distal end 171. Referring now to FIGS. 13 and 14, the first end 170 has a width dimension 172, and the second end 171 has a width dimension 173, which is greater than the width dimension 172. The first end 170 has a length dimension 174, which is substantially similar to the length dimension of the passageway 82. Further, the width dimension of the second portion 152 is less than about the width dimension of the passageway 82 as defined by the main body 43 of the link 41. Additionally, the second end 171 is defined by a peripheral edge 176, and which has a substantially frusto-pyramidal shape. This shape substantially corresponds to the shape of the peripheral edge 65 of the sprocket engaging tooth 60. When the traction component 150 is releasably inserted into the link 41, the second end 171 of the second portion 152 enters and is matingly forceably received into the passageway 82. In light of its resilient, deformable composition, the second end 171 will deform during the insertion as it enters the passageway 82, but will expand or otherwise resume its original shape when the second end has passed through the passageway 82. Thus, it will be recognized that the second portion 152 firmly attaches the traction component 150 to the main body 43 of the link 143 in the manner of a snap-fit. Further, when fully inserted, the first portion 151 of the traction component 150 is matingly received, at least in part, within the receiving station 70, and the second end 171 of the second portion 152 is substantially aligned with, and located between the first and second portions of the sprocket engagement tooth 60, as illustrated in FIG. 2. One skilled in the art will recognize that other means of firmly attaching a detachable traction component are possible.

Operation

The operation of the described embodiment of the present invention is believed to be readily apparent and is briefly summarized at this point.

In one form of the invention, as partially depicted in FIG. 1, a toy tracked vehicle 12 may be powered by one or more motors (not shown). Using either on-board or remote controls (not shown), the toy vehicle 12 may be placed into motion by applying force from the drive motor(s) so as to impart rotational movement to one or more of the drive sprockets 23 and 24, as earlier discussed. Of course, non-motorized variants of the toy tracked vehicle 12 can provide equal recreational value.

Referring again to FIG. 1, the endless track 10 that is the subject of the present invention is entrained or drivingly positioned therebetween a first drive sprocket 23, which is mounted on a first axle 21, and second drive sprocket 24, which is mounted on a second axle 22. As the drive sprockets 23 and 24 are placed into rotational motion thereabout axles 21 and 22, rotational energy or force is imparted to the plurality of sprocket teeth 30. As the sprocket teeth 30 move in a rotational path of travel around the respective axles, a first side wall 32 of one sprocket teeth 30 will contact the leading edge 53 of a first link 41. The respective sprocket teeth are matingly, drivingly received within a link gap 123 (as depicted in FIG. 2). The rotational force applied to the respective drive sprockets 23 or 24 is transferred to the first link 41, thus moving the first link in a forward direction. As the first link continues forward, the second side wall 33 of the sprocket tooth 30 will enter the link gap 123. As the drive sprocket continues to rotate, the adjacent sprocket tooth will then engage the link gap 123 of the next adjacent link. If the drive sprocket is operated in the reverse direction, the opposite will occur. One skilled in the art will recognize that the rotational energy applied to the respective drive sprockets 23, 24, or both, will be transferred into a substantially linear force, which is generally directed along the plurality of coupled, adjacent links 40. When the coupled links 40 are in contact with a supporting surface 11, this linear motion will propel the toy tracked vehicle 12 in a forward or reverse direction, depending upon the rotational direction of the respective drive sprocket. This ability of the depicted embodiment of the toy tracked vehicle to move relative to a supporting surface 11 adds to the usefulness and recreational value of the toy tracked vehicle.

Referring now to FIGS. 5-10, details of the operation to couple and uncouple a first link 41, and an adjacent second link 42 is now provided. One skilled in the art will recognize that a salient feature of the invention described herein is the relative ease with which the coupling and uncoupling can occur. When the first link 41 and the second link 42 are uncoupled, as shown in FIG. 10, the two links are oriented such that outwardly facing surface 56 of the main body 43 of the first link 41 is at an angle of about 90 degrees relative to the outwardly facing surface 56 of the main body 43 of the second link 42. As earlier discussed, the width dimension of the first cavity 111 of the male linking end or member 100 of the second link 42 is slightly greater than the width dimension of the posts 130 and 131, which are located at the female linking end 120 of the first link 41. However, the width dimension of the first cavity 111 is less than the length dimension of the respective posts 130 and 131. Therefore, the posts 130 and 131 can only be received within, and at least partly occlude the first cavity 111 when the respective posts and the first cavity are substantially coaxially aligned and oriented in substantially parallel spaced relation relative to the x axis 44. This occurs when the angular relationship between the first and second links 41 and 42 as measured between the outwardly facing surfaces 56 is about 90 degrees. This is seen in FIGS. 9 and 10, respectively. It will be appreciated that depending upon the relative width dimensions of the respective posts 130 and 131 and the first cavity 111, the angular relationship between the first and second links 41 and 42, as measured between the outwardly facing surfaces 56 thereof lies in a range of greater than about 45 degrees to less than about 110 degrees. In some forms of the invention, the first and second links 41 and 42 can be coupled and uncoupled when the angular relationship between the links is less than about 150 degrees.

Referring still to FIGS. 5-10, it will be understood that once the posts 130 and 131 have entered the first cavity 111, the posts will proceed through the first cavity and enter, and at least partly occlude, the second cavity 112. The second cavity has a length and a width dimension that are both larger than the length and width dimensions of the posts. Still further, it will be appreciated that the smaller protrusions 132 and 133 are individually received with the third cavity 113 when the post is inserted into the receiving cavity. This provides the hobbyist with a positive tactile response as the protrusions 132 and 133 snap fit within the third cavity 113. This will indicate that the posts 130 and 131 are properly seated within the receiving cavities 110. Once the respective posts 130 and 131 are properly seated, they are able to substantially freely rotate within the second cavity 112. So long as the angular relationship between the first link 41 and the second link 42 substantially exceeds 90 degrees, as measured between the outwardly facing surfaces 56, as shown in FIG. 8, The posts 130 and 131 will not be able to exit the receiving cavity 110. In this manner, the first and second links are coupled together. It will be appreciated that the coupled links 41 and 42 may substantially freely rotate, one relative to the other, when the angular relationship between the first and second links 41 and 42, as measured between the outwardly facing surfaces 56, lies in a range of greater than about 110 degrees to less than about 270 degrees. In some forms of the invention, the coupled links will not uncouple and will be allowed to freely rotate, one relative to the other, when the angular relationship between the first and second links 41 and 42 lies in a range of greater than about 110 degrees to less than about 270 degrees. Uncoupling the first link 41 from the adjacent second link 42 is done in a likewise but reverse manner.

Therefore, a first aspect of the present invention relates to an endless track 10 which includes a plurality of links 40 which are releasably, rotatably coupled together to form an endless track 10 and wherein each of the links 40 has a male linking end 100, and an opposite female linking end 120, and an outwardly facing surface 56. The male linking end 100 with a first link 41 releasably couples and decouples from the female linking end 120 of an adjacent second link 42 when the angular relationship between the first and second links, as measured between the outwardly facing surfaces thereof, lies in a range of greater than about 45° to less than 110°.

Another aspect of the present invention relates to an endless track 10 which includes a plurality of detachable adjacent links 41 and 42 each comprising a main body 43 with inwardly and outwardly facing surfaces 55 and 56, respectively. Each of the links 41 and 42 has a male linking end 100 and an opposite female linking end 120. The male linking end 100 protrudes from the main body 43 and the female linking end 120 includes a receiving station 121. The receiving station 121 of a first link 41 releasably, matingly couples with the male linking end 100 of a second, adjacent link when the angular relationship as measured between the outwardly facing surfaces of the first and second links are oriented at an angle of less than about 110°. Still further, the male linking end 100 of the second link 42 freely rotates within the receiving cavity 121 of the first link 41 without detaching from the first link 41 when the angular relationship is measured between the outwardly facing surfaces of the first and second links 41 and 42 is at an angle of greater than about 110°.

Still another aspect of the present invention relates to an endless track link 40 which includes a main body 43 which has a leading and a trailing edge 53 and 54, respectively. Still further, the main body 43 includes a male linking member 100 extending outwardly relative to the leading edge 53 and a female receiving station 121 made integral with the trailing edge 54 of the main body 43, and which is dimensioned to receive the male linking member 100 of an adjacent endless track link 42. Still further, the endless track link 40 includes a detachable traction component 150 which is releasably matingly coupled to the main body 43 of the endless track link 40. The detachable traction component 150 has a first portion 151 which is juxtaposed relative to the outwardly facing surface 56 of the main body 43, and a second deformable portion 152 which is sized so as to be received through the passageway 82 which is formed in the main body 43. The same deformable portion couples the detachable traction component 150 to the main body 43 in the manner of a snap-fit and also further fills the space 66 therebetween the first and second portions 61 and 62 of the sprocket engaging tooth 60.

Therefore, it will be seen that the endless track link of the present invention provides many advantages over the endless track links utilized heretofore. Still further, the endless track links can be coupled and decoupled from each other in an expeditious manner, and without the benefit of any tools and which further allows a hobbyist to assemble and disassemble endless belts of various lengths so that they may be employed on assorted different designs of toys and the like for various recreational purposes.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. An endless track comprising:
 a plurality of detachable adjacent links, each comprising a main body with inwardly and outwardly facing surfaces, a male linking end, and an opposite female linking end; and wherein the male linking end protrudes from the main body, and the female linking end includes a receiving station, and wherein the receiving station of a first link releasably matingly couples with the male linking end of a second adjacent link when the angular relationship as measured between the outwardly facing surfaces of the first and second links are oriented at an angle of less than about 110 degrees; and wherein the male linking end of the second link freely rotates within the receiving station of the first link without detaching from the first link when the angular relationship as measured between the outwardly facing surfaces of the first and second links is at an angle of greater than about 110 degrees, and wherein the main body is defined by x, y, and z axes, and wherein the male linking end is substantially coaxially aligned relative to the y axis; and wherein the at least one receiving cavity is oriented substantially parallel to the x axis; and wherein the at least one receiving cavity further comprises a first cavity having a width dimension which is measured in a direction which is substantially parallel to the y axis; and a second cavity that is coupled to the first cavity and which extends in the direction of the inwardly facing surface of the main body, and which is further oriented in substantially parallel relation relative to the z axis; and wherein the second cavity has a length and a width dimension; and wherein the receiving station is substantially coaxially oriented relative to the y axis; and wherein the at least one post is oriented in substantially parallel relation relative to the x axis, and further has a length dimension when measured in a direction which is substantially parallel to the y axis, and a width dimension when measured in a direction which is substantially parallel to the z axis; and wherein the length dimension of the post is greater than the width dimension thereof; and wherein the width dimension of the first cavity is greater than the width dimension of the post, and is less than the length dimension of the post; and wherein the length and width dimensions of the second cavity are greater than the length dimension of the post; and wherein the post of the first link enters the first cavity of the second adjacent link when the angular relationship between the first and second links, as measured between the outwardly facing surfaces thereof lies in a range of greater than about 45 degrees to less than about 110 degrees; and wherein the post of the first link enters the second cavity of the second adjacent link such that the post and the second cavity are substantially coaxially aligned and oriented in substantially parallel spaced relation relative to the x axis; and wherein the first and second links substantially freely rotate, one relative to the other when the angular relationship between the first and second links, as measured between the outwardly facing surfaces, lies in a range of greater than about 110 degrees to less than about 270 degrees, and wherein the plurality of adjacent links are fabricated of a moldable, castable, or machinable material.

2. An endless track as claimed in claim 1, and wherein a smaller protrusion extends substantially coaxially, outwardly relative to the post, and is further oriented in substantially parallel spaced relation relative to the x axis; and wherein the receiving cavity is further defined by a third cavity which is coupled to the first and second cavities, and which extends in an orientation which is substantially parallel to the x axis; and wherein the smaller protrusion is received in the third cavity when the post is inserted into the receiving cavity.

3. An endless track link, comprising:
 a main body which has a leading and a trailing edge, and wherein the main body has opposite first and second ends, and a length dimension which is measured between the opposite first and second ends;
 a male linking member extending outwardly relative to the leading edge, and wherein the male linking member has a length dimension which is less than the length dimension of the main body, and wherein the male linking member further comprises a first and a second receiving cavity which are defined by the male linking end and which are further coupled together, and wherein the first and second receiving cavities each have a cross sectional dimension, and wherein the cross sectional dimension of the second receiving cavity is greater than the cross sectional dimension of the first receiving cavity;
 a female receiving station made integral with the trailing edge of the main body, and which is dimensioned to receive the male linking member of an adjacent endless track link; and
 a detachable traction component releasably matingly coupled to the main body of the endless track link.

4. An endless track link as claimed in claim 3, and wherein the female receiving station defines a cavity which has a length dimension which is equal to or greater than the length dimension of the male linking member; and wherein the endless track link further comprises:
 a post which is made integral with the female receiving station, and which occludes, at least in part, the cavity which is defined by the female receiving station, and wherein the post is dimensioned so as to pass through the first receiving cavity of the male linking member of an adjacent endless track link when the post is positioned in a given orientation relative to the adjacent male linking member, and wherein upon passing through the first receiving cavity, the post is rotatably received within the second cavity as defined by the adjacent male linking member.

5. An endless track link as claimed in claim 4, and wherein the main body is defined, at least in part, by opposite inwardly and outwardly facing surfaces, and wherein the post is operable to pass through the first receiving cavity and be rotatably received within the second receiving cavity of an adjacent male linking member when the outwardly facing surfaces of the adjacent endless track links are oriented at an angle of about 45 degrees to about 110 degrees, one relative to the other, and wherein the adjacent endless track links substantially freely rotate in an angular range of about 110 degrees to about 270 degrees, one relative to the other, as that is measured between the outwardly facing surfaces of the adjacent endless track links.

6. An endless track link as claimed in claim 5, and wherein the main body further comprises:

a sprocket tooth which extends substantially normally outwardly relative to the inwardly facing surface of the main body, and wherein the sprocket tooth has a first and a second portion which are disposed in spaced relation, one relative to the other, and wherein the main body further defines a passageway which extends between the first and second outside facing surfaces of the main body, and wherein the passageway has opposite first and second ends, and wherein the first end of the passageway is positioned between the first and second portions of the sprocket tooth.

7. An endless track link as claimed in claim 6, and wherein the detachable traction component further comprises:

a first portion having opposite first and second surfaces, and wherein the first surface of the first portion is juxtaposed relative to the outwardly facing surface of the main body of the endless track link; and a second portion made integral with the first portion, and which extends normally outwardly relative to the first surface of the first portion, and wherein the second portion has a first end which is affixed to the first portion, and a distal, deformable, second end which is remote thereto, and wherein each of the first and second ends of the second portion have a width dimension, and wherein the width dimension of the second end is greater than that of the first end thereof.

8. An endless track link as claimed in claim 7, and wherein the passageway defined by the main body has a width dimension which is greater than the width dimension of the first end of the second portion, and less than the width dimension of the second end of the second portion, and wherein the second end of the second portion is deformed so as to move through the passageway, and be received between the first and second portions of the sprocket tooth.

9. An endless track link as claimed in claim 7, and wherein the main body of the endless track link, and the detachable traction component are each fabricated from a moldable thermoplastic material, and wherein the main body of the endless track link has a hardness greater than a hardness of the detachable traction component.

10. An endless track link, comprising:

an elongated main body having opposite first, and second ends, and a leading and a trailing peripheral edge, and wherein the main body is defined, at least in part, by opposite inwardly and outwardly facing surfaces, and wherein a passageway is formed substantially centrally of the main body, and extends between the inwardly and outwardly facing surfaces;

a male linking member made integral with the leading edge of the main body and positioned between the opposite first and second ends thereof, and wherein the male linking member has a length dimension and further extends substantially normally outwardly relative to the leading peripheral edge;

a female receiving station made integral with the trailing edge of the main body, and which defines a cavity having a length dimension which is equal to or greater than the length dimension of the male linking member; and a detachable traction component having a first portion which is juxtaposed relative to the outwardly facing surface of the main body and a second deformable portion which is sized so as to be received through the passage, and which couples the detachable traction component to the main body in the manner of a snap-fit.

11. An endless track link as claimed in claim 10, and wherein the main body of the endless track link, and the detachable traction component, are each fabricated from a moldable material, and wherein the main body of the endless track link has a hardness greater than a hardness of the detachable traction component.

12. An endless track link as claimed in claim 10, and further comprising a sprocket tooth having first and second portions which extend substantially normally outwardly relative to the inwardly facing surface, and wherein the first and second portions are positioned on the opposite sides of the passageway, and which terminates at the inwardly facing surface, and wherein the second deformable portion of the traction component is located between the first and second portions of the sprocket tooth.

13. An endless track link as claimed in claim 10, and wherein a cooperating cavity is defined by the outwardly facing surface of the main body and which receives, at least in part, the first portion of the detachable traction component, and wherein the passageway defined by the main body terminates within the cooperating cavity as defined by the outwardly facing surface.

14. An endless track link as claimed in claim 10, and wherein a first link rotates substantially freely relative to an adjacent second link without decoupling from the second link when the angular relationship between the first and second links, as measured between the outwardly facing surfaces thereof, lies in a range of greater than about 110 degrees, to less than about 270 degrees.

15. An endless track link as claimed in claim 14, and wherein the male linking end of a first link releasably couples and decouples from the female receiving station of an adjacent second link when the angular relationship between the first and second links as measured between the outwardly facing surfaces of the first and second links lies in a range of greater than about 45 degrees to less than about 110 degrees.

* * * * *